Figure 1:
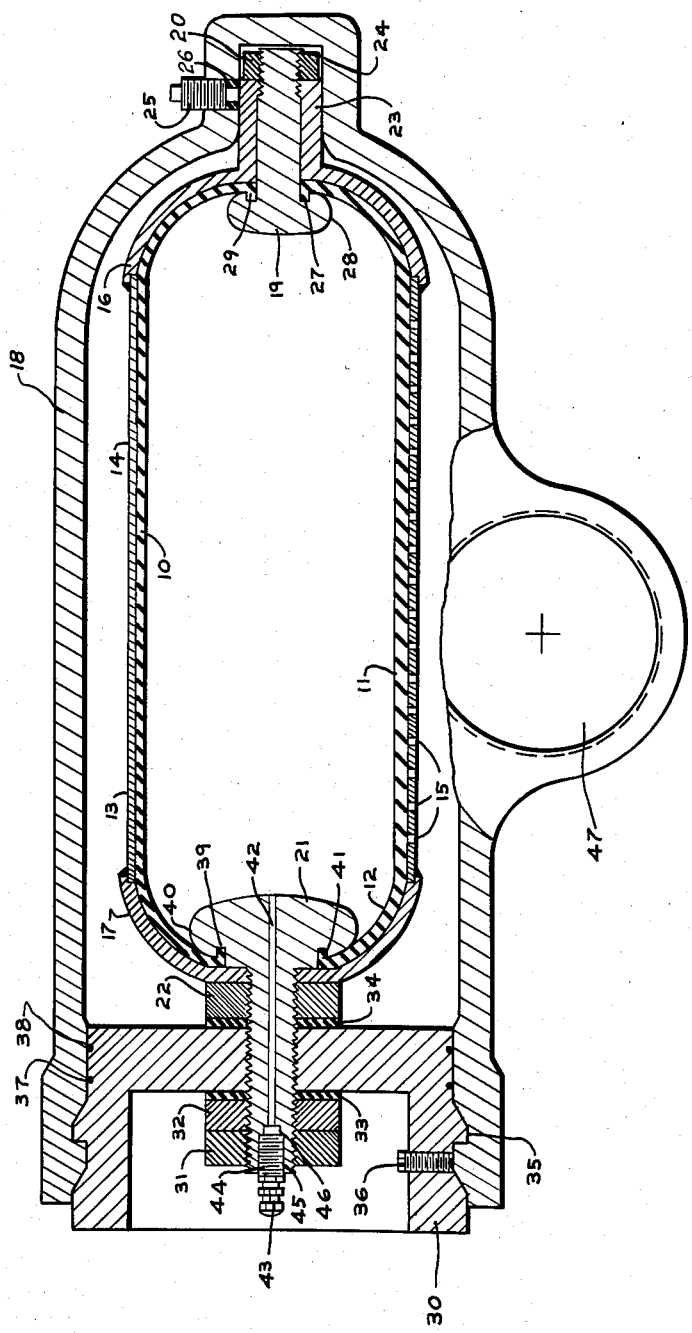

Jan. 17, 1961 M. A. BALL 2,968,319
PULSATION DAMPENER
Filed Oct. 21, 1957

INVENTOR.
MELVIN A. BALL
BY John Joseph Hall
ATTORNEY.

2,968,319

PULSATION DAMPENER

Melvin A. Ball, 5216 Levelside St., Lakewood, Calif.

Filed Oct. 21, 1957, Ser. No. 691,467

6 Claims. (Cl. 138—30)

This invention relates to improvements in the design of pulsation dampeners. Heretofore, pulsation dampeners which serve the same purpose as my invention have included a central mandrel to support the bladder contained in such dampeners. My invention does away with the need for a central mandrel, thereby decreasing the cost of manufacture of such pulsation dampeners, and providing a bladder assembly of such pulsation dampeners which is easier to assemble in the process of manufacture. Furthermore, the design of my invention permits a series of pulsation dampeners to be placed in a lying down position, rather than straight up in the air, thereby greatly facilitating inspection and maintenance of such pulsation dampeners.

Existing designs of pulsation dampeners maintain their bladders under pressure while in the static condition, thereby keeping their bladders under constant tension. Such constant tension results in a shorter useful life of such bladders, thus requiring frequent replacement of the bladder assembly, and increased maintenance costs. My invention provides a bladder which is free from tension and stress in the static condition. I have provided a bladder formed in a shape which, in the static condition, exactly follows the inside contours of the bladder assembly, and is therefore free from tension and stress, thereby greatly increasing the useful life of the bladder.

It is, therefore, an object of my invention to provide a pulsation dampener which can be easily assembled and disassembled, including a bladder assembly which can be replaced as a unit in itself.

Another object of my invention is to provide a pulsation dampener which dispenses with the need for a central mandrel or any mandrel at all in its operation.

A further object of my invention is to provide a bladder which is free from tension in the static condition of the pulsation dampener.

A still further object of my invention is to provide a pulsation dampener which can be used in series in the lying down position.

These and other objects will be more readily understood by reference to the following description and claims, taken in conjunction with the accompanying drawing, forming a part hereof, in which Figure 1 is a longitudinal sectional view of the pulsation dampener in the static condition.

In the embodiment of my invention as shown in Figure 1, the bladder 10 is in the static position. While the bladder may be made of any elastomeric material, I have found that a synthetic rubber such as Buna-N is the best material for use in the pulsation dampener. Only part of the bladder moves in the operation of the device, which is the thick section 11 of the bladder 10. This unilateral movement of the bladder 10 greatly reduces the strain on the curved portion 12 of the bladder during the operation of the pulsation dampener. The bladder 10 is part of the bladder assembly 13 and is surrounded by the remainder of the bladder assembly 13 which consists of a cylinder 14 having perforations on one side as shown at 15. The cylinder is welded to half spheres 16 and 17, at each end.

The bladder assembly 13 is mounted on the housing 18 by anchor bolt 19 which clamps the bladder 10 to half sphere 16 by means of the nut 20 on one side, and by anchor bolt 21 which clamps the bladder 10 to half sphere 17 by means of the nut 22 on the other side of the bladder 10.

The bladder assembly 13 is attached on one side to the housing 18 by a nub 23 on half sphere 16. The nub 23 fits into the center recess 24 of the housing 18. The anchor bolt 19 threads into the nub 23, which is secured to the housing 18 by the set screw 25. The O-ring type seal 26 at the inner end of the set screw 25 prevents any leakage of the fluid being dampened out of the pulsation dampener. An annular groove 27 cut into the underside of the head 28 of anchor bolt 19 provides a seal in conjunction with the lip 29 of the bladder 10 thereby preventing gas contained in the interior of the bladder from leaking out.

The other end of the bladder assembly 13 is attached to the housing 18 by anchor bolt 21 which threads into the plug cap 30 and is secured to the plug cap 30 by nuts 31 and 32. The gaskets 33 and 34 prevent any leakage of fluid being dampened. The plug cap 30 fits into the housing 18 by a bayonet type connection 35 and is fixed into position by set screw 36. The O-ring type seals 37 and 38 serve to prevent any leakage of the fluid being dampened. An annular groove 39 cut into the underside of the head 40 of anchor bolt 21 provides a seal in conjunction with the lip 41 of the bladder 10 thereby preventing gas contained in the interior of the bladder 10 from leaking out.

Anchor bolt 21 contains a longitudinal bore 42 for the passage of gas into the bladder 10 through the valve 43 at the outer end of anchor bolt 21. The valve 43 contains threads 44 which mesh with corresponding threads 45 in a recess 46 at the outer end of anchor bolt 21.

In the operation of the device, the fluid being dampened flows into the pulsation dampener through pipe opening 47 in the housing 18. At this time, the bladder 10 is in the static condition and in complete contact with the inside area of the bladder assembly 13. The interior of the bladder has been filled with a gas such as nitrogen at a pressure of approximately 500 pounds per square inch. As the fluid flows in under pulsations from the external line, the fluid passes through the perforations 15 of the cylinder 14 and presses against the thick section 11 of the bladder 10. The pressure of the fluid forces the thick section 11 of the bladder 10 inwards, thereby compressing the gas inside the bladder and dissipating the energy and pressure resulting from the pulsations of the fluid in the external line.

If required, several units of the pulsation dampener may be placed in series in the lying down position by utilizing spacing nipples between the several pipe openings of the pulsation dampeners.

Also, the entire bladder assembly 13 including the bladder 10 may be easily replaced as a unit by merely removing the plug cap 30 and loosening set screw 25. The entire bladder assembly may then be removed and a new one inserted in its place.

While I have described my invention in detail with reference to the accompanying drawing illustrating the preferred form of my invention, it is understood that numerous changes in the details of construction and arrangement of parts may be made without departing from the spirit and scope of the invention as hereinafter claimed.

I claim:

1. A bladder assembly removably insertable in the housing of a pulsation dampener comprising a cylinder with rounded ends and perforated on one side, a collapsible bladder fitting the inside contour of the cylinder while in an uncharged condition and secured to each end of the cylinder with end members, and adapted to be pre-charged with gas when placed inside the cylinder, valve means permitting pre-charging of the bladder with gas before insertion of the bladder assembly in the housing, and means removably mounting the cylinder with the bladder as a unit pre-charged with gas in the housing.

2. A pulsation dampener comprising, a housing having an inlet, a perforated cylinder with rounded ends, a collapsible bladder fitting the inside contour of the cylinder while in an uncharged condition and secured to each end of the cylinder with end members, and adapted to be pre-charged with gas, valve means permitting pre-charging of the bladder with gas before insertion of the cylinder and bladder in the housing, and means removably mounting the cylinder with the bladder pre-charged in the housing.

3. A pulsation dampener comprising, a housing having an inlet, a perforated cylinder with rounded ends, a collapsible bladder fitting the inside contour of the cylinder while in an uncharged condition and secured to each end of the cylinder with end members, and adapted to be pre-charged with gas, a cap member for removably mounting the cylinder with the bladder pre-charged with gas in the housing, and valve means permitting pre-charging the bladder with gas.

4. A pulsation dampener comprising, a housing having an inlet, a cylinder with rounded ends and perforations on one side, an elastomeric bladder fitting the inside contour of the cylinder while in an uncharged condition and secured to each end of the cylinder with end members, one end member having an opening therethrough, a valve threaded into the opening of an end member for permitting pre-charging of the bladder with gas while in the cylinder before mounting the cylinder with the bladder in the housing, and a cap member for removably mounting the cylinder with the bladder pre-charged with gas in the housing.

5. A bladder assembly removably insertable in the housing of a pulsation dampener comprising a cylinder with rounded ends and perforated on one side, a collapsible bladder formed to fit the inside contour of the cylinder while in an uncharged condition and secured to each end of the cylinder with end members, one end member having an opening therethrough, a valve threaded into the opening of an end member for permitting pre-charging of the bladder with gas while in the cylinder before mounting the cylinder with the bladder in the housing, and means for removably mounting the cylinder with the bladder pre-charged with gas as a unit in the housing.

6. A pulsation dampener comprising, a housing having an inlet, a cylinder with rounded ends and perforations on one side, a collapsible bladder formed to fit the inside contour of the cylinder while in an uncharged condition and secured to each end of the cylinder with end members, and adapted to be charged with gas when placed inside the cylinder, valve means permitting pre-charging the bladder with gas before insertion of the bladder and cylinder in the housing, and means for removably mounting the cylinder with the bladder pre-charged with gas as a unit in the housing.

References Cited in the file of this patent

UNITED STATES PATENTS

| | | |
|---|---|---|
| 2,196,993 | Kidder | Apr. 16, 1940 |
| 2,278,688 | Caminez | Apr. 7, 1942 |
| 2,349,322 | White | May 23, 1944 |
| 2,354,201 | Dand et al. | July 25, 1944 |
| 2,459,317 | Granberg | Jan. 18, 1949 |
| 2,530,190 | Carver | Nov. 14, 1950 |
| 2,563,257 | Loukonen | Aug. 7, 1951 |
| 2,630,834 | Weber et al. | Mar. 10, 1953 |
| 2,712,831 | Day | July 12, 1955 |
| 2,731,984 | Everett | Jan. 24, 1956 |